US012717663B2

(12) United States Patent
Li et al.

(10) Patent No.: US 12,717,663 B2
(45) Date of Patent: Aug. 25, 2026

(54) METHOD AND APPARATUS FOR INTER-PROCESS COMMUNICATION, AND COMPUTER STORAGE MEDIUM

(71) Applicant: HUAWEI TECHNOLOGIES CO., LTD., Shenzhen (CN)

(72) Inventors: Yu Li, Beijing (CN); Qiang Huang, Hangzhou (CN); Wentao Zhang, Hangzhou (CN); Boshi Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 762 days.

(21) Appl. No.: 18/158,828

(22) Filed: Jan. 24, 2023

(65) Prior Publication Data

US 2023/0161650 A1 May 25, 2023

Related U.S. Application Data

(63) Continuation of application No. PCT/CN2021/109816, filed on Jul. 30, 2021.

(30) Foreign Application Priority Data

Jul. 30, 2020 (CN) ......................... 202010754461.3

(51) Int. Cl.
*G06F 9/54* (2006.01)
*G06F 12/1009* (2016.01)

(52) U.S. Cl.
CPC .......... *G06F 9/545* (2013.01); *G06F 12/1009* (2013.01)

(58) Field of Classification Search
CPC ........ G06F 9/545; G06F 12/1009; G06F 9/54; G06F 12/10; G06F 2209/543
See application file for complete search history.

(56) References Cited

U.S. PATENT DOCUMENTS 6,832,266 B1 * 12/2004 Shaylor ................... G06F 9/544 719/321
7,360,213 B1 * 4/2008 Alfieri ................... G06F 9/4484 718/100

(Continued)

FOREIGN PATENT DOCUMENTS

CN 101477477 A 7/2009
CN 103279367 A 9/2013

(Continued)

OTHER PUBLICATIONS

"Introduction" (Mar. 15, 2020) pp. 1-27 [retrieved from https://web.archive.org/web/20200315010808/https://linux-kernel-labs.github.io/refs/heads/master/lectures/intro.html]. (Year: 2020).*

(Continued)

*Primary Examiner* — Brian W Wathen
(74) *Attorney, Agent, or Firm* — Fish & Richardson P.C.

(57) ABSTRACT

Embodiments of this application disclose example methods and example apparatuses for inter-process communication, and example computer storage medium. One example method in embodiments of this application includes executing a first instruction, where the first instruction instructs a first process to invoke a second process. In response to executing the first instruction, a kernel switches a context of the first process to a context of the second process based on the first instruction The second process can then be executed. The first process can be an application program in a user mode or a system program in a user mode, and the second process can be a first system program in a kernel mode.

18 Claims, 7 Drawing Sheets

(56) References Cited

U.S. PATENT DOCUMENTS 11,074,114 B1 * 7/2021 Kostyushko ........ G06F 9/45537
2010/0083261 A1 4/2010 Jayamohan et al.
2016/0266946 A1 * 9/2016 Adda .................. G06F 11/0715

FOREIGN PATENT DOCUMENTS

CN 107168801 A 9/2017
CN 107003899 B 10/2020

OTHER PUBLICATIONS

Liu et al., "Efficient Method to Improve Performance of Micro-Kernel Operating System," Journal Of Shanghai Jiaotong University, vol. 34, No. 7, Jul. 2000, 5 pages.
Mi et al., "Fast and secure inter-process communication for microkernels," Proceedings of the Fourteenth EuroSys Conference 2019, Mar. 25, 2019, pp. 1-15.
Sun, "Non-root Process: A Process abstraction Layer based on hardware-assisted virtualization," Thesis for the degree of Master, Zhejiang University, Feb. 15, 2016, 103 pages (with English abstract).
Xie et al., "Layered and separated operating system kernel," Computer Applications, vol. 25, No. 6, Jun. 2005, 4 pages.
International Search Report and Written Opinion in International Appln. No. PCT/CN2021/109816, mailed on Oct. 11, 2021, 20 pages (with English translation).
Extended European Search Report in European Appln. No. 21850827.3, mailed on Nov. 29, 2023, 8 pages.

* cited by examiner

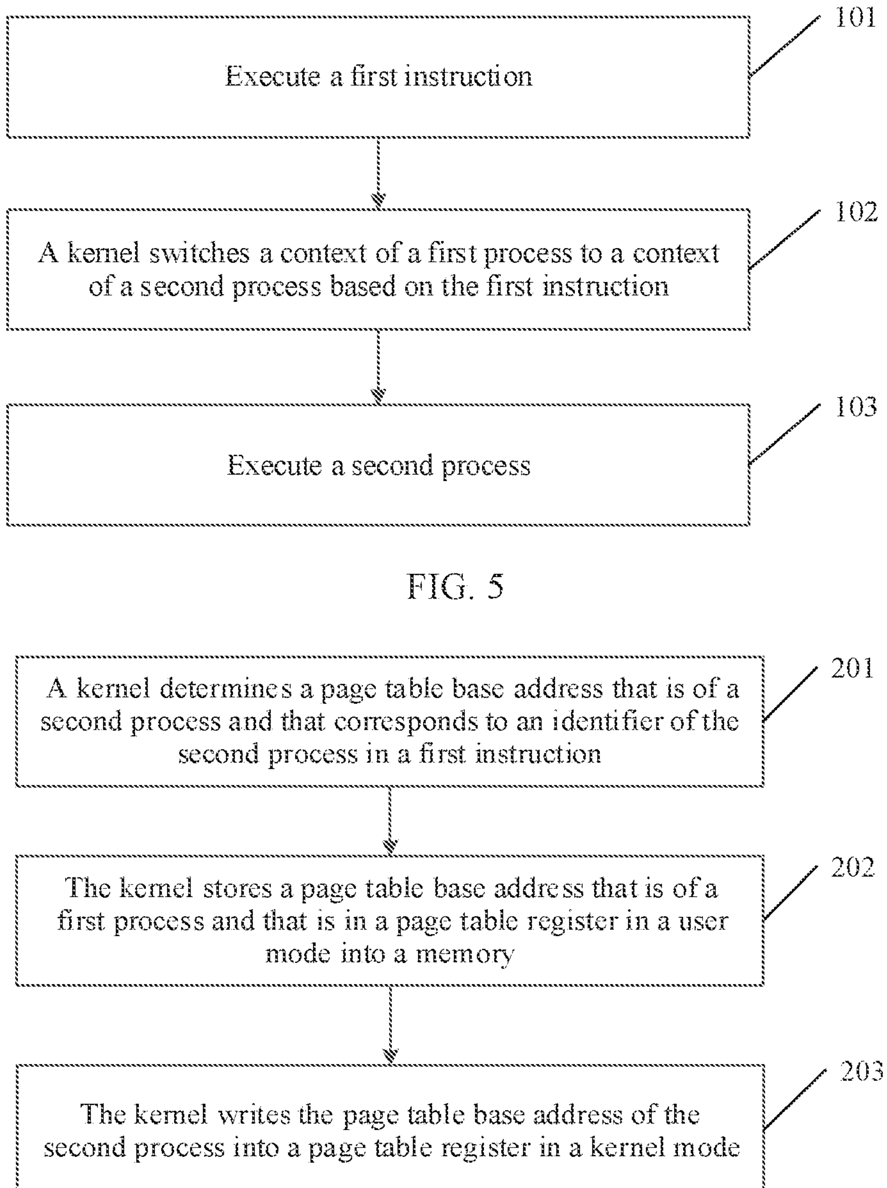
Execute a first instruction
101
A kernel switches a context of a first process to a context of a second process based on the first instruction
102
Execute a second process
103
FIG. 5
A kernel determines a page table base address that is of a second process and that corresponds to an identifier of the second process in a first instruction
201
The kernel stores a page table base address that is of a first process and that is in a page table register in a user mode into a memory
202
The kernel writes the page table base address of the second process into a page table register in a kernel mode
203
FIG. 6

METHOD AND APPARATUS FOR INTER-PROCESS COMMUNICATION, AND COMPUTER STORAGE MEDIUM

CROSS-REFERENCE TO RELATED APPLICATIONS

This application is a continuation of International Application No. PCT/CN2021/109816, filed on Jul. 30, 2021, which claims priority to Chinese Patent Application No. 202010754461.3, filed on Jul. 30, 2020. The disclosures of the aforementioned applications are hereby incorporated by reference in their entireties.

TECHNICAL FIELD

This application relates to the field of computer technologies, and in particular, to a method and an apparatus for inter-process communication, and a computer storage medium.

BACKGROUND

A microkernel-based operating system architecture (a microkernel architecture for short) is widely used in scenarios such as a cloud platform, an embedded device, a mobile device, and unattended driving. The microkernel architecture retains a very small quantity of real core functions of the microkernel architecture, and many components in a conventional operating system kernel (for example, a monolithic kernel architecture Linux) such as system programs are run in a process in a user mode.

Compared with a conventional operating system kernel, the microkernel architecture can ensure that any module that bears a complex function can be placed in a process in a user mode, to isolate different processes. This manner can greatly enhance isolation and reliability of the operating system. For example, after a malicious application program in a user mode attacks a system program in a user mode, only a file that can be accessed by the system program may be accessed by the malicious application program, and another system program is still in a protected state. In addition, if a system program triggers an internal vulnerability and causes the system program to crash, only the system program itself is affected, but correctness of the entire operating system is not affected. An administrator can easily restart the system program to continue providing services. This also improves reliability compared with the conventional operating system kernel.

However, the microkernel architecture also greatly deteriorates performance. Because the application program running in a user mode is isolated from the system program running in a user mode, the system program cannot directly access address space of the application program, resulting in poor performance of the microkernel architecture.

SUMMARY

Embodiments of this application provide a method and an apparatus for inter-process communication, and a computer storage medium, to improve performance of an operating system.

According to a first aspect, embodiment of this application provides a method for inter-process communication. The method is applied to a computer device, and the method includes: executing a first instruction, where the first instruction instructs a first process to invoke a second process, the first process is an application program or a system program in a user mode, and the second process is a first system program in a kernel mode; in response to the first instruction, a kernel switches a context of the first process to a context of the second process based on the first instruction; and executing the second process. The first instruction is a preset instruction for an application program to invoke a system program. The context is a context of a process, and specifically, is various types of data of a process maintained in an operating system, and usually includes a page table used by the process, virtual address space of the process, metadata of the process, a number of the process, and the like.

After the kernel switches the context of the first process to the context of the second process, the second process may directly access virtual address space corresponding to the first process. In an existing microkernel, a process of a system program cannot directly access virtual address space corresponding to another process running in a user mode. Compared with the existing microkernel, this embodiment of this application can improve performance of an operating system. In addition, because the first system program runs as the independent second process instead of running as one process together with the kernel, a size of the kernel is reduced. This reduces an attack surface of the kernel.

In a possible implementation, that a kernel switches a context of the first process to a context of the second process includes: The kernel determines a page table base address that is of the second process and that corresponds to an identifier of the second process in the first instruction, and specifically, the kernel may determine the context of the second process based on the identifier of the second process, where the page table base address is a type of context; the kernel stores a page table base address that is of the first process and that is in a page table register in a user mode into a memory; and the kernel writes the page table base address of the second process into a page table register in a kernel mode. Different page table registers are separately used in a user mode and in a kernel mode. The page table register is configured to store a page table base address, and the page table base address is a part of a page table. The page table indicates an association relationship between a virtual address and a physical address corresponding to the first process, and the page table base address is a base address that is of a page in the virtual address space and that is in a physical address memory.

The kernel stores the page table base address that is of the first process and that is in the page table register in a user mode into the memory, and writes the page table base address of the second process into the page table register in a kernel mode, to switch the page table base address of the first process to the page table base address of the second process.

In a possible implementation, the first instruction carries a virtual address of the first process, and the virtual address may be a specific virtual address in the virtual address space, or may be a segment of the virtual address in the virtual address space. After the second process is executed, the method further includes: The second process reads, based on a page table of the first process, data in the physical address corresponding to the virtual address of the first process. The page table includes an association relationship between the virtual address and the physical address of the first process.

Because the second process may directly read, based on the page table of the first process, the data in the physical address corresponding to the virtual address of the first process, and does not need to read, by using the kernel, the data in the physical address corresponding to the virtual address of the first process, performance of the operating system can be improved.

In a possible implementation, the method further includes: executing a second instruction, where the second instruction instructs the second process to invoke the kernel or a third process; and in response to the second instruction, the kernel switches the context of the second process to a context of the kernel or the third process, where the third process is a second system program running in a kernel mode. The second instruction is a preset instruction for a system program to invoke a program or to invoke a kernel.

The second process invokes the second instruction, to enable the first system program to invoke the kernel, and to enable the first system program to invoke the second system program.

In a possible implementation, for a second virtual address, the kernel or the third process has different access permission from the second process, and the second virtual address is an address in kernel space. That a kernel switches a context of the first process to a context of the second process based on the first instruction includes: The kernel determines access permission that corresponds to the identifier of the second process in the first instruction and that is of the second process for the second virtual address; and the kernel writes the access permission of the second process for the second virtual address into a first register. The first register is configured to store access permission for the address in the kernel space.

Specifically, for the second virtual address, different domains may be separately configured for the second process and the third process. Similarly, for the second virtual address, different domains may alternatively be separately configured for the second process and the kernel. Then, the access permission is configured for the second virtual address by setting a relationship between the domain and the access permission.

For the second virtual address, the kernel has different access permission from the second process. Therefore, in a context switching process, the access permission of the second process for the second virtual address is written into the first register, to control access of the second process to the virtual address. The first register stores only the access permission of the second process for the second virtual address, but does not store access permission of the kernel for the second virtual address. Therefore, the second process can be isolated from the kernel, and access of the kernel to the virtual address is not affected by the second process.

In a possible implementation, that the kernel switches the context of the second process to a context of the kernel or the third process includes: The kernel determines access permission of the kernel for the second virtual address based on an identifier of the kernel in the second instruction; and the kernel updates the access permission that is of the second process for the second virtual address and that is in the first register to the access permission of the kernel for the second virtual address.

For the second virtual address, the second process has different access permission from the kernel. In this way, the second process can be isolated from the kernel, to ensure security of the second process and the kernel.

In a possible implementation, that the kernel switches the context of the second process to a context of the kernel or the third process includes: The kernel determines access permission of the third process for the second virtual address based on an identifier of the third process in the second instruction; and the kernel updates the access permission that is of the second process for the second virtual address and that is in the first register to the access permission of the third process for the second virtual address.

For the second virtual address, the second process has different access permission from the third process. In this way, the second process can be isolated from the third process, to ensure security of the second process and the third process.

In a possible implementation, the access permission of the second process for the second virtual address and the access permission of the third process for the second virtual address are separately stored in different page tables; or the access permission of the second process for the second virtual address and the access permission of the kernel for the second virtual address are separately stored in different page tables.

The access permission of the second process for the second virtual address and the access permission of the third process for the second virtual address are separately stored in different page tables. In this way, the maliciously attacked second process can obtain only a page table storing the access permission of the second process. Therefore, only the access permission of the second process for the second virtual address can be read, and the access permission of the third process for the second virtual address cannot be read. This further ensures isolation between the second process and the third process, and improves security of the operating system.

Similarly, the access permission of the second process for the second virtual address and the access permission of the kernel for the second virtual address may alternatively be separately stored in different page tables. In this way, the maliciously attacked second process can obtain only a page table storing the access permission of the second process. Therefore, only the access permission of the second process for the second virtual address can be read, and the access permission of the kernel for the second virtual address cannot be read. This further ensures isolation between the second process and the kernel, and improves security of the operating system.

In a possible implementation, the operating system further includes a third system program that runs in a kernel mode as an independent fourth process. The second process and the fourth process have same access permission for the address in the kernel space.

Because the second process and the fourth process have the same access permission for the address in the kernel space, in the context switching process, the access permission of the second process for the address in the kernel space and the access permission of the fourth process for the address in the kernel space do not need to be switched. This reduces overheads of context switching and improves performance of the operating system. According to a second aspect, embodiments of this application provide an apparatus for inter-process communication. The apparatus includes: an execution unit, configured to execute a first instruction, where the first instruction instructs a first process to invoke a second process, the first process is an application program or a system program in a user mode, and the second process is a first system program in a kernel mode; a switching unit, configured to switch a context of the first process to a context of the second process based on the first instruction; and the execution unit, further configured to execute the second process.

In a possible implementation, the switching unit is for a kernel to determine a page table base address that is of the second process and that corresponds to an identifier of the second process in the first instruction; store a page table base address that is of the first process and that is in a page table register in a user mode into a memory; and write the page table base address of the second process into a page table register in a kernel mode.

In a possible implementation, the first instruction carries a virtual address of the first process. The apparatus further includes a reading unit, configured to read, based on a page table of the first process, data in a physical address corresponding to the virtual address of the first process. The page table includes an association relationship between the virtual address and the physical address of the first process.

In a possible implementation, the execution unit is further configured to execute a second instruction, where the second instruction instructs the second process to invoke the kernel or a third process; and the switching unit is further configured to switch the context of the second process to a context of the kernel or the third process, where the third process is a second system program running in a kernel mode.

In a possible implementation, for a second virtual address, the kernel or the third process has different access permission from the second process, and the second virtual address is an address in kernel space. The switching unit is for the kernel to determine access permission that corresponds to the identifier of the second process in the first instruction and that is of the second process for the second virtual address; and write the access permission of the second process for the second virtual address into a first register. The first register is configured to store access permission for the address in the kernel space.

In a possible implementation, the switching unit is configured to determine access permission of the kernel for the second virtual address based on an identifier of the kernel in the second instruction; and update the access permission that is of the second process for the second virtual address and that is in the first register to the access permission of the kernel for the second virtual address.

In a possible implementation, the switching unit is configured to determine access permission of the third process for the second virtual address based on an identifier of the third process in the second instruction; and update the access permission that is of the second process for the second virtual address and that is in the first register to the access permission of the third process for the second virtual address.

In a possible implementation, the access permission of the second process for the second virtual address and the access permission of the third process for the second virtual address are separately stored in different page tables; or the access permission of the second process for the second virtual address and the access permission of the kernel for the second virtual address are separately stored in different page tables.

In a possible implementation, the operating system further includes a third system program that runs in a kernel mode as an independent fourth process. The second process and the fourth process have same access permission for the address in the kernel space.

For specific implementations, related descriptions, and technical effects of the foregoing units, refer to descriptions in the first aspect of embodiments of this application.

According to a third aspect, embodiments of this application provide a computer device, including at least one processor and a memory. The memory stores computer-executable instructions that can be run on the processor. When the computer-executable instructions are executed by the processor, the computer device performs the method for inter-process communication according to any one of the implementations of the first aspect.

According to a fourth aspect, embodiments of this application provide a chip or a chip system. The chip or the chip system includes at least one processor and a communication interface. The communication interface and the at least one processor are interconnected through a line. The at least one processor is configured to run a computer program or instructions, to perform the method for inter-process communication according to any one of the implementations of the first aspect.

According to a fifth aspect, embodiments of this application provide a computer storage medium. The computer storage medium is configured to store computer software instructions used by the foregoing computer device, and the computer software instructions include a program designed for execution by the computer device.

The computer device may be the apparatus for inter-process communication described in the second aspect.

According to a sixth aspect, embodiments of this application provide a computer program product. The computer program product includes computer software instructions. The computer software instructions may be loaded by a processor to implement the method for inter-process communication according to any one of the implementations of the first aspect.

According to the foregoing technical solutions, it can be learned that embodiments of this application have the following advantages:

Executing a first instruction, where the first instruction instructs a first process to invoke a second process, the first process is an application program or a system program in a user mode, and the second process is a first system program in a kernel mode; in response to the first instruction, a kernel switches a context of the first process to a context of the second process based on the first instruction; and executing the second process. After the kernel switches the context of the first process to the context of the second process, the second process may directly access virtual address space corresponding to the first process. In an existing microkernel, a process of a system program cannot directly access virtual address space corresponding to another process running in a user mode. Compared with the existing microkernel, this embodiment of this application can improve performance of an operating system. In addition, because the first system program runs as the independent second process instead of running as one process together with the kernel, a size of the kernel is reduced. This reduces an attack surface of the kernel.

BRIEF DESCRIPTION OF DRAWINGS

FIG. 5 is a schematic diagram of an embodiment of a method for inter-process communication according to an embodiment of this application;

FIG. 6 is a schematic diagram of a first embodiment of context switching according to an embodiment of this application;

DESCRIPTION OF EMBODIMENTS

An embodiment of this application provides a method for inter-process communication, to improve system performance of an operating system.

First, a kernel mode and a user mode are described. The kernel mode and the user mode are two working states of a central processing unit (CPU). If a process executes code of system invoking to execute kernel, it is referred to that the process is in a kernel mode; or if a process executes user code, it is referred to that the process is in a user mode. The kernel mode may alternatively be referred to as a privileged mode, and the user mode may alternatively be referred to as a non-privileged mode. The following uses the kernel mode and the user mode for description.

Specifically, in an ARM architecture, EL0 indicates a user mode, and EL1 indicates a kernel mode. In an X86 architecture, ring3 indicates a user mode, and ring0 indicates a kernel mode.

Figure 1:
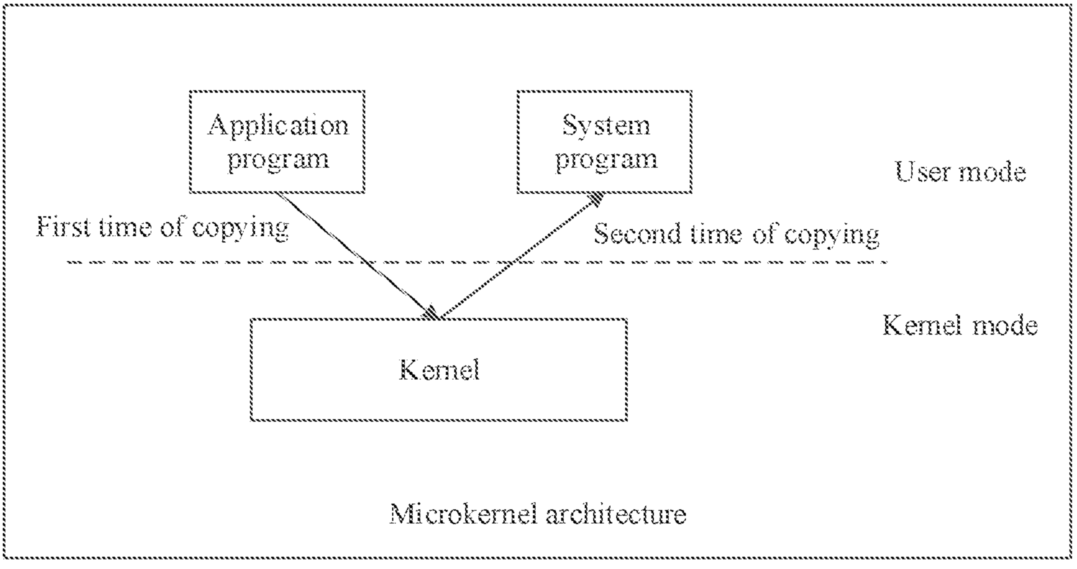
FIG. 1 is a schematic diagram of an architecture of an existing microkernel.

As shown in FIG. 1, in an existing microkernel architecture, an application program and a system program respectively run in a user mode as independent processes, a kernel runs in a kernel mode, and the application program needs to access the system program by using the kernel. However, because the application program is isolated from the system program, the system program cannot access address space of the application program, resulting in poor performance of the microkernel architecture.

For example, if the application program needs to obtain a read/write service of the system program, data needs to be copied at least twice. Therefore, performance of the microkernel architecture is poor. Specifically, FIG. 1 shows an example in which the application program obtains a write service of the system program. To be specific, the application program invokes the system program to write data in the application program into a memory. In this case, the kernel needs to first access address space of the application program, to copy the data in the address space of the application program to address space of the kernel. Then, the kernel copies the data in the address space of the kernel to address space of the system program. Finally, the system program writes the data in the address space of the system program into the memory. Therefore, in a process in which the application program obtains the write service of the system program, at least first time of copying and second time of copying need to be performed.

Figure 2:
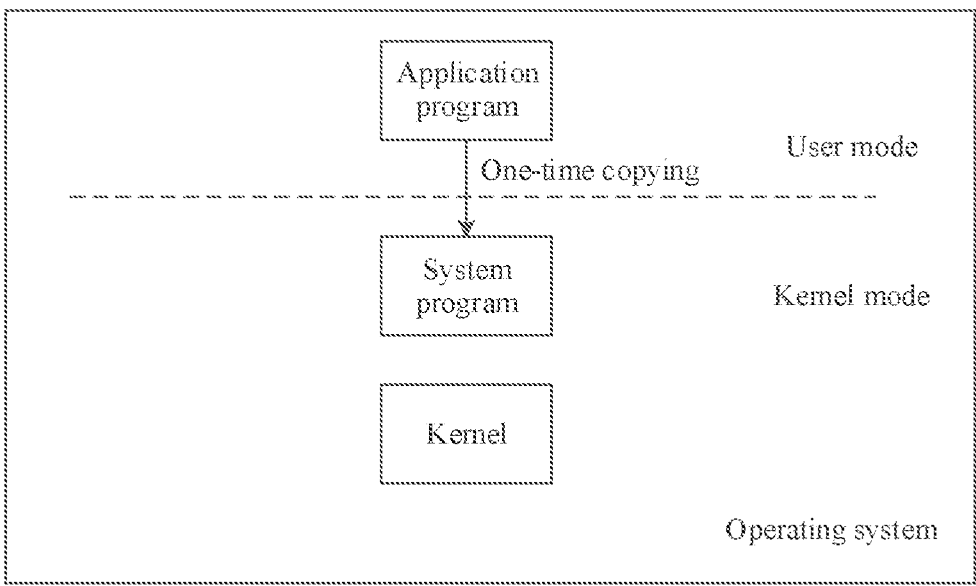
FIG. 2 is a schematic diagram of an architecture of an operating system according to an embodiment of this application.

Therefore, an embodiment of this application provides a solution. In this solution, an architecture of an operating system is first adjusted, and then inter-process communication is performed in the adjusted architecture of the operating system, to implement inter-program access. Specifically, as shown in FIG. 2, in this embodiment of this application, an architecture of an operating system includes a system program that runs in a kernel mode as an independent process, an application program that runs in a user mode as an independent process, and a kernel that independently runs in a kernel mode. It can be learned from FIG. 1 and FIG. 2 that, compared with the existing microkernel architecture, a running location of a system program in this embodiment of this application changes, that is, the system program runs in a kernel mode as an independent process. It should be understood that in the operating system, a process in a kernel mode has high access permission, that is, the process in a kernel mode may directly access address space corresponding to a process in a user mode. Therefore, the system program in this embodiment of this application may directly access address space of the application program, to improve system performance of the operating system. The following describes in detail the solutions provided in embodiments of this application.

Before the method for inter-process communication provided in embodiments of this application is described, related terms in embodiments of this application are first described.

A process is a running entity of a program. A program is a description of an instruction, data, and an organization form thereof, and the process is the running entity of the program. There may be a plurality of concurrent threads in one process, and all the threads execute different tasks in parallel. The thread may be an actual operating unit of the process. However, in embodiments of this application, the thread is not clearly distinguished from the process and is replaced with the process during description.

A context is a context of a process, and specifically, is various types of data of a process maintained in an operating system, and usually includes a page table used by the process, virtual address space of the process, metadata of the process, a number of the process, and the like.

Figure 3:
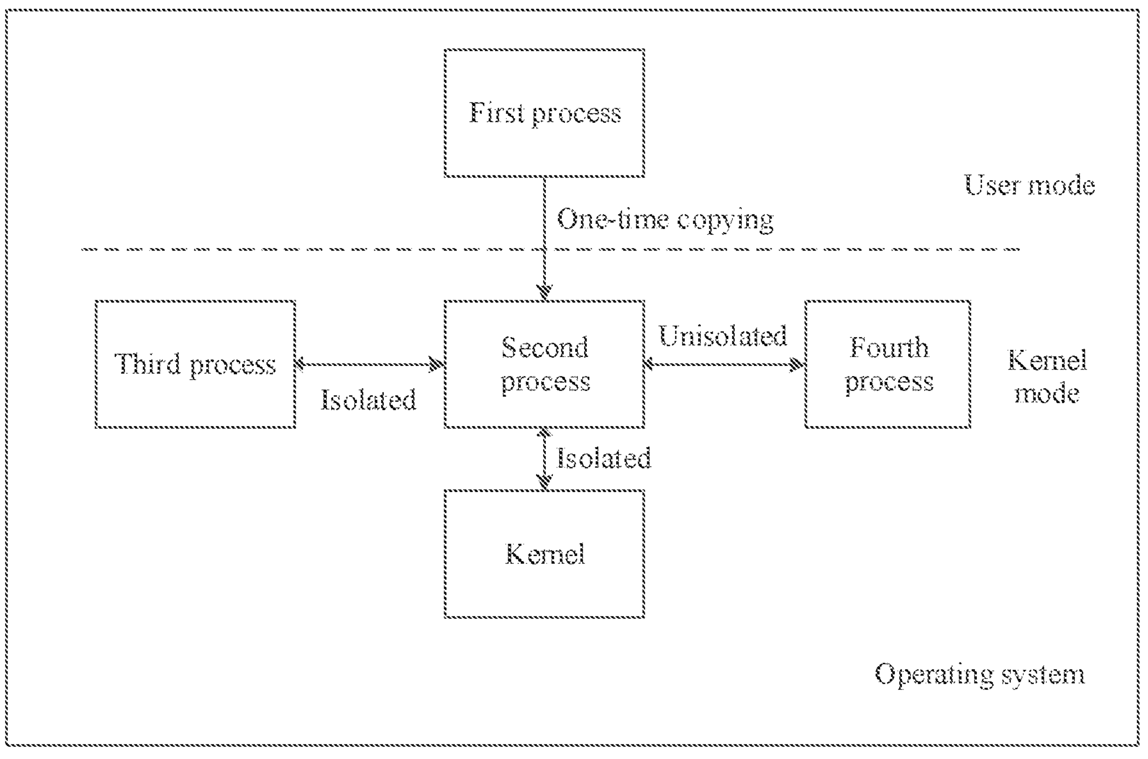
FIG. 3 is a schematic diagram of a specific embodiment of an architecture of the operating system shown in FIG. 2.

FIG. 3 is a schematic diagram of a specific embodiment of an architecture of the operating system shown in FIG. 2. As shown in FIG. 3, an embodiment of this application provides an embodiment of a method for inter-process communication. The method is applied to a computer device. The computer device includes a hardware layer and an operating system running at the hardware layer. The operating system includes a running kernel (kernel), a program that runs in a user mode as an independent first process, and a first system program that runs in a kernel mode as an independent second process.

A system program is a system that controls and coordinates computer devices and external devices and supports development and running of application software, and the system program is a set of programs that require no user intervention.

An application program corresponds to system software, is program design languages that a user may use and a set of programs compiled by the program design languages. The application program is divided into an application software package and a user program.

The operating system in this embodiment of this application may be applied to platforms of a plurality of architectures such as an Intel (Intel) architecture, an ARM architecture, and an AARCH64 architecture.

Figure 4:
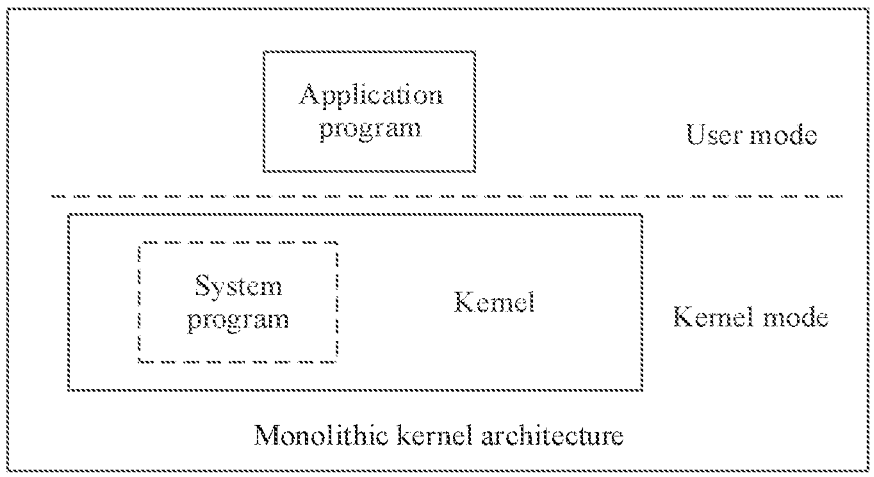
FIG. 4 is a schematic diagram of an architecture of an existing monolithic kernel.

The first system program running in a kernel mode as an independent second process may be understood as that the system program in a kernel mode is independently loaded and run as an independent executable file. However, as shown in FIG. 4, in an existing monolithic kernel architecture, a system program and a kernel run in a kernel mode as a process, that is, the system program and the kernel are loaded and run as an executable file. Therefore, the system program may be considered as a part of the kernel, that is, the system program may be considered as a functional module in the kernel. In this embodiment of this application, the system program is identified as the functional module in the kernel in a form of a dashed box. It can be learned from FIG. 3 and FIG. 4 that, compared with the monolithic kernel architecture, in this embodiment of this application, the system program that is in a same process as the kernel and that is in the monolithic kernel architecture is separated from the process in which the kernel is located, that is, the system program runs in a kernel mode as an independent process, instead of being in the same process as the kernel. Correspondingly, in this embodiment of this application, the first system program runs in a kernel mode as an independent second process.

It should be understood that, in the operating system, the kernel and another process (including a process of the application program and a process of the system program) usually access a physical address by using a virtual address, and there is a correspondence between the virtual address and the physical address. The physical address is used for memory chip-level unit addressing, and corresponds to an address bus.

In the architecture shown in FIG. 1, because the kernel runs in a kernel mode, and another process runs in a user mode, to ensure security of the kernel, the operating system usually forbids the another process from directly accessing the kernel (the kernel can be accessed only by invoking), and the kernel can directly access the another process. In a specific implementation, the operating system basically divides virtual address space into two parts: One part is kernel space, and the other part is user space.

Using a 32-bit Linux operating system as an example, virtual address space (also referred to as addressing space or linear address space) of the 32-bit Linux operating system is 4 G. Theoretically, maximum address space corresponding to the kernel, the process of the application program, and the process of the system program respectively is 4 G. However, to ensure security of the kernel, in the Linux operating system, a highest 1 G byte (from a virtual address 0xC0000000 to a virtual address 0xFFFFFFFF) is used by the kernel, and is referred to as kernel space. Lower 3G bytes (from a virtual address 0x00000000 to a virtual address 0xBFFFFFFF) are used by the another process and are referred to as user space.

Code running in a kernel mode may freely access the entire virtual address space (for example, may be from the virtual address 0xC0000000 to the virtual address 0xFFFFFFFF, and from the virtual address 0x00000000 to the virtual address 0xBFFFFFFF) without any limitation, or may directly access a port. However, code running in a user mode is subject to many checks of a CPU, and can only access the user space (for example, from the virtual address 0x00000000 to the virtual address 0xBFFFFFFF).

It can be learned from the foregoing description that, in this embodiment of this application, the first process may use the user space (which may be from the virtual address 0x00000000 to the virtual address 0xBFFFFFFF). Because the second process runs in a kernel mode, the second process may use the kernel space (which may be from the virtual address 0xC0000000 to the virtual address 0xFFFFFFFF). In addition, running of the second process in a kernel mode is not limited, and may also access the user space (which may be from the virtual address 0x00000000 to the virtual address 0xBFFFFFFF).

It should be noted that in this embodiment of this application, a program that runs in a user mode as an independent first process may be an application program or a system program. This is not specifically limited in this embodiment of this application. There may be a plurality of first system programs. For example, the first system programs may be any one of the following system programs: a file system program, a memory management program, a network program, and a driver. Functions of the kernel include but are not limited to an exception processing function, a timer function, a function for inter-process communication, and a memory mapping function.

Based on the architecture of the operating system shown in FIG. 3, as shown in FIG. 5, the method for inter-process communication provided in embodiments of this application includes the following steps.

Step 101: Execute a first instruction. The first instruction instructs a first process to invoke a second process, the first process is an application program or a system program in a user mode, and the second process is a first system program in a kernel mode. Specifically, the first process invokes the first instruction, and the first instruction is executed by a central processing unit (CPU) at a hardware layer, so that a kernel switches a context of the first process to a context of the second process.

The first instruction is a preset instruction for an application program to invoke a system program.

Step 102: The kernel switches the context of the first process to the context of the second process based on the first instruction.

Based on the foregoing related description of the context, in this embodiment of this application, the kernel switching the context of the first process to the context of the second process may be understood as that the kernel stores various data of the first process in a register or a program counter into a memory, and writes various data of the second process in the memory into the register or the program counter.

It should be noted that the context of the second process and the context of the first process each include a plurality of types. For a same type of context, a register used by the first process may be the same as a context used by the second process, and a register used by the first process may alternatively be different from a context used by the second process. Similarly, for a same type of context, a program counter used by the first process may be the same as a context used by the second process, and a program counter used by the first process may alternatively be different from a context used by the second process.

Because the context of the second process and the context of the first process each include a plurality of types, details are not described in this embodiment of this application. The following describes the context switching process by using a specific example.

Step 103: Execute a second process.

It may be understood that the second process is executed by the CPU. Because the CPU can execute only one process at a time, after the kernel switches the context of the first process to the context of the second process, the CPU suspends execution of the first process, and starts to execute the second process.

In this embodiment of this application, when the first process needs to access the second process (which may also be considered as that the first process invokes the second process), the first process invokes the first instruction. In this case, the CPU executes the first instruction. After the CPU executes the first instruction, the kernel switches the context of the first process to the context of the second process, so that the first process invokes the second process. After the kernel switches the context of the first process to the context of the second process, the second process may directly access virtual address space corresponding to the first process. In an existing microkernel, a process of the system program cannot directly access virtual address space corresponding to another process running in a user mode. Compared with the existing microkernel, this embodiment of this application can improve performance of the operating system. In addition, because the first system program runs as an independent second process instead of running as one process together with the kernel, a size of the kernel is reduced. This reduces an attack surface of the kernel.

It can be learned from the foregoing description that, in this embodiment of this application, the second process runs in a kernel mode, and the first process runs in a user mode. Therefore, configuration information of the first process is different from configuration information of the second process. There may be a plurality of types of configuration information. This is described below in detail.

Based on the foregoing embodiments, in another embodiment of the method for inter-process communication provided in embodiments of this application, a virtual address that is of the first process and that has a mapping relationship with a physical address is an address in user space, and a virtual address that is of the second process and that has a mapping relationship with the physical address is an address in kernel space.

It can be learned from the foregoing description that, because the process needs to access the physical address by using the virtual address, in this embodiment of this application, both the configuration information of the first process and the configuration information of the second process include a virtual address that has a mapping relationship with the physical address. Specifically, the virtual address that is of the first process and that has a mapping relationship with the physical address is the address in the user space, and the virtual address that is of the second process and that has a mapping relationship with the physical address is the address in the kernel space.

Based on the foregoing embodiments, in another embodiment of the method for inter-process communication provided in embodiments of this application, the configuration information of the first process and the configuration information of the second process may further include a register configured to store a context. It can be learned from the foregoing description that, for a same type of context, a register used by the first process may be different from a context used by the second process. For example, the register may be a page table register. The page table register is configured to store a page table base address, and the page table base address is a part of a page table. The page table indicates an association relationship between a virtual address and a physical address corresponding to the first process, and the page table base address is a base address that is of a page in the virtual address space and that is in a physical address memory.

Specifically, the first process runs in a user mode. Therefore, a page table register used by the first process is a page table register in a user mode. The second process runs in a kernel mode. Therefore, a page table register used by the second process is a page table register in a kernel mode.

Based on a case in which a page table base address belongs to a type of context, in this embodiment of this application, as shown in FIG. 6, the kernel switching the context of the first process to the context of the second process includes the following steps.

Step 201: The kernel determines a page table base address that is of the second process and that corresponds to an identifier of the second process in the first instruction.

It may be understood that the first instruction may carry an identifier of the second process, and the kernel may determine the context of the second process based on the identifier of the second process. The page table base address is a type of context.

Step 202: The kernel stores a page table base address that is of the first process and that is in a page table register in a user mode into the memory.

It may be understood that the page table base address is usually stored in the memory.

Step 203: The kernel writes the page table base address of the second process into a page table register in a kernel mode.

It may be understood that, the kernel usually writes the page table base address of the second process in the memory into the page table register in a kernel mode.

By performing step 201, step 202, and step 203, the kernel switches the page table base address of the first process to the page table base address of the second process.

In the foregoing embodiment, the kernel switches the context of the first process to the context of the second process, so that the first process invokes the second process. In most scenarios, after the second process is invoked, the context of the second process finally needs to be switched back to the context of the first process.

Therefore, in another embodiment of the method for inter-process communication provided in embodiments of this application, the method for inter-process communication provided in embodiments of this application may further include the following steps:

The second process invokes a third instruction. The third instruction is executed by a central processing unit (CPU) at a hardware layer, so that the kernel switches the context of the second process to the context of the first process.

Similar to a process of switching the context of the first process to the context of the second process, the switching the context of the second process to the context of the first process may include:

The kernel determines the page table base address of the second process based on an identifier of a process in the first instruction. The kernel stores the page table base address that is of the first process and that in the page table register in a user mode. The kernel writes the page table base address of the second process into the page table register in a kernel mode.

Based on the foregoing embodiment, the process of switching the context of the first process to the context of the second process is described. Therefore, the process of switching the context of the second process to the context of the first process may be understood with reference to related descriptions of the process of switching the context of the first process to the context of the second process.

In addition to the page table register, the register configured to store the context may further include a number register configured to store a number of a process. Specifically, based on the foregoing embodiments, in another embodiment of the method for inter-process communication provided in embodiments of this application, the kernel switching the context of the first process to the context of the second process may further include:

The kernel stores a number that is of the first process and that is in a number register in a user mode into the memory, determines a number that is of the second process and that corresponds to an identifier of the second process in the first instruction, and writes the number of the second process into a number register in a kernel mode.

The number of the first process belongs to one type of identifier of the first process, and the number of the second process belongs to one type of identifier of the second process.

It should be noted that the register configured to store the context may further include one or more registers, which are not enumerated in this embodiment of this application.

The foregoing describes, by using a plurality of examples, that the configuration information of the first process is different from the configuration information of the second process. In addition, the configuration information of the first process and the configuration information of the second process may further include an exception vector table.

The exception vector table includes an exception description and an address corresponding to the exception. The exception may be understood as follows: Because of some internal or external events, the processor stops work being processed, and then processes these events. When an exception occurs, the processor jumps to an address corresponding to the exception to execute an exception handler, and the address corresponding to the exception is an exception vector.

It can be learned from related descriptions of the foregoing embodiment that, after the first instruction is executed, the kernel switches the context of the first process to the context of the second process. Specifically, after the first instruction is executed, an exception is generated, and the exception is captured by the kernel. Then, the kernel switches the context of the first process to the context of the second process based on the description of the exception in the exception vector table and the exception vector. In this embodiment of this application, the exception includes an interrupt.

It should be noted that, because the first process runs in a user mode, and the second process runs in a kernel mode, an exception vector corresponding to the second process is different from an exception vector table corresponding to the first process.

It can be learned, based on the foregoing description, performance of the operating system can be improved in embodiments of this application. The following uses an embodiment to specifically describe that performance of the operating system can be improved by using the solutions provided in this application.

Specifically, based on the foregoing embodiments, in another embodiment of the method for inter-process communication provided in embodiments of this application, the first instruction carries a virtual address of the first process, and the first process may be a specific virtual address in virtual address space, or may be a segment of virtual address in the virtual address space. After the first process invokes the first instruction, the method further includes:

The second process reads, based on a page table of the first process, data in a physical address corresponding to the virtual address of the first process. The page table includes an association relationship between the virtual address and the physical address of the first process.

It may be understood that the second process runs in a kernel mode, and the first process runs in a user mode. Because a process in a kernel mode has high access permission, that is, can access a virtual address of a process in a user mode, the second process may directly access the virtual address of the first process, to read data in the physical address corresponding to the virtual address of the first process.

For example, when an application program running as an independent first process needs to obtain a write service of a system program running as an independent second process, the first process invokes the first instruction, so that the kernel switches the context of the first process to the context of the second process. In this way, the second process may directly access the virtual address that is of the first process and that is carried in the first instruction, and then read data in the physical address corresponding to the virtual address of the first process, to finally complete data writing. It can be learned from the example of obtaining a write service shown in FIG. 1 that in this embodiment of this application, data writing can be completed by copying data only once. Therefore, in this embodiment of this application, performance of the operating system can be improved.

The foregoing describes the process in which the first process in a user mode invokes the second process in a kernel mode. The following describes a process in which the second process in a kernel mode invokes another object in a kernel mode.

It may be understood that, in addition to the first system program, a process of another system program may further run in a kernel mode. Specifically, based on the foregoing embodiments, in another embodiment of the method for inter-process communication provided in embodiments of this application, the operating system further includes a second system program that runs in a kernel mode as an independent third process.

Based on this, the method further includes:

Execute a second instruction. The second instruction instructs the second process to invoke the kernel or the third process.

A process of executing the second instruction is similar to a process of executing the first instruction by the CPU. For details, refer to the foregoing related description of the process of executing the first instruction for understanding.

A difference lies in that the second instruction is a preset instruction for a system program to invoke a program or to invoke a kernel.

The kernel switches the context of the second process to a context of the kernel or the third process. The third process is a second system program running in a kernel mode.

The second system program is different from the first system program, and may alternatively be any one of the following system programs: a file system program, a memory management program, a network program, and a driver.

The second process invokes the second instruction, to enable the first system program to invoke the kernel, and to enable the first system program to invoke the second system program.

It should be noted that because the context of the third process and the context of the kernel each include a plurality of types, details are not described in this embodiment of this application. The following describes the context switching process by using a specific example.

In this embodiment of this application, because the second process, the third process, and the kernel all run in a kernel mode, the second process, the third process, and the kernel may share some information. This can reduce overheads of context switching, and improve performance of the operating system. For example, the second process, the third process, and the kernel may share one page table, that is, a correspondence between a virtual address and a physical address of the second process, a correspondence between a virtual address and a physical address of the third process, and a correspondence between the kernel and the physical address are all stored in a same page table. In a context switching process, there is no need to switch the page table register. This can improve performance of the operating system.

It should be noted that the information shared by the second process, the third process, and the kernel may be selected based on an actual requirement. This is not limited in this embodiment of this application.

It should be understood that the second process runs in a kernel mode. Therefore, theoretically, the second process and the kernel share kernel space. In this case, if a malicious application program attacks a system program, the kernel and the second system program (that is, the third process) may also be accessed by the malicious application program. Therefore, if the second process, the third process, and the kernel are in an unisolated state, security of the operating system is poor.

Therefore, based on the foregoing embodiment, in another embodiment of the method for inter-process communication provided in embodiments of this application, for a second virtual address, the kernel or the third process has different access permission from the second process. The second virtual address is an address in kernel space.

It should be noted that the second virtual address may be a specific address in the kernel space, or may be any address in the kernel space. If the second virtual address is any address in the kernel space, the second process and the third process have different access permission for each address in the kernel space, and the second process and the kernel also have different access permission for each address in the kernel space. In this way, the second process can be completely isolated from the kernel, and the second process can be completely isolated from the third process. Even if the second process is maliciously attacked, the malicious attacked second process has only access permission of the second process itself for an address in the kernel space, and does not obtain access permission of the kernel or the third process for the address in the kernel space. This ensures security of the second process, the third process, and the kernel. If the second virtual address may be a specific address in the kernel space, it means that for a virtual address, the second process and the kernel may have same access permission, or the second process and the third process may have same access permission. In this way, when context switching between the second process and the kernel is performed, the access permission of the second process and the kernel for the virtual address does not need to be switched. Similarly, when context switching between the second process and the third process is performed, the access permission of the second process and the third process for the virtual address does not need to be switched.

Figure 7:
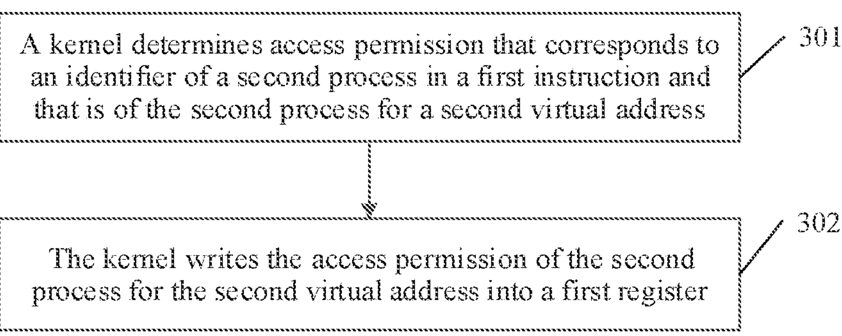
FIG. 7 is a schematic diagram of a second embodiment of context switching according to an embodiment of this application.

Based on the foregoing description, in this embodiment of this application, as shown in FIG. 7, the kernel switching the context of the first process to the context of the second process further includes:

Step 301: The kernel determines access permission that corresponds to the identifier of the second process in the first instruction and that is of the second process for the second virtual address.

It may be understood that the kernel may determine the context of the second process based on the identifier of the second process, and the access permission of the second process for the second virtual address also belongs to the context of the second process.

Step 302: The kernel writes the access permission of the second process for the second virtual address into a first register.

The first register is configured to store access permission for the address in the kernel space.

In this embodiment of this application, because for the second virtual address, the kernel or the third process has different access permission from the second process. Therefore, in a context switching process, the access permission of the second process for the second virtual address is written into the first register, to control access of the second process to the virtual address. The first register stores only the access permission of the second process for the second virtual address, but does not store access permission of the kernel for the second virtual address. Therefore, the second process can be separately isolated from the kernel and the third process, and access of the kernel and the third process to the virtual address is not affected by the second process.

Figure 10:
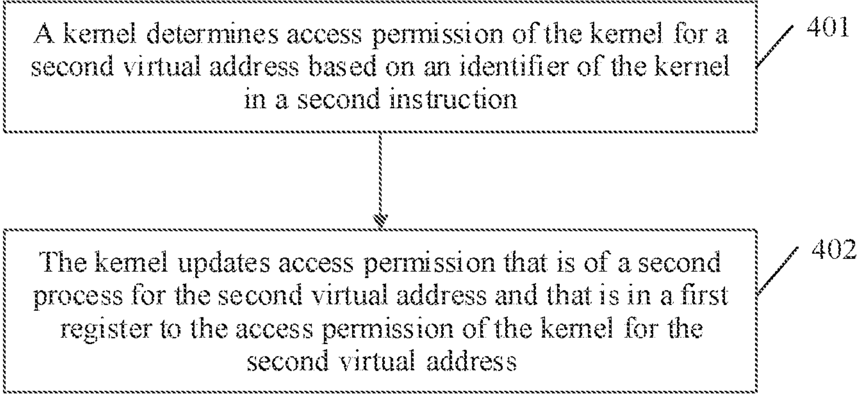
FIG. 10 is a schematic diagram of another embodiment of a storage location of a correspondence between a virtual address and a domain.

Based on the foregoing embodiments, as shown in FIG. 10, in another embodiment of the method for inter-process communication provided in embodiments of this application, the kernel switching the context of the second process to a context of the kernel or the third process includes:

Step 401: The kernel determines the access permission of the kernel for the second virtual address based on an identifier of the kernel in the second instruction.

It may be understood that, because for the second virtual address, the kernel has different access permission from the second process, the access permission of the kernel for the second virtual address is first determined in the context switching process.

Step 402: The kernel updates the access permission that is of the second process for the second virtual address and that is in the first register to the access permission of the kernel for the second virtual address.

After determining the access permission of the kernel for the second virtual address, the kernel updates the access permission that is of the second process for the second virtual address and that is in the first register to the access permission of the kernel for the second virtual address, to control access of the kernel to the virtual address, and isolate the second process from the kernel.

Similarly, the kernel switching the context of the second process to a context of the kernel or the third process may further include: The kernel determines access permission of the third process for the second virtual address based on an identifier of the third process in the second instruction; and the kernel updates the access permission that is of the second process for the second virtual address and that is in the first register to the access permission of the third process for the second virtual address.

It should be noted that a process in which the kernel switches the context of the second process to the context of the third process is similar to a process in which the kernel switches the context of the second process to the context of the kernel. For details, refer to the related description of the process in which the kernel switches the context of the second process to the context of the kernel.

In this embodiment of this application, the access permission of the second process for the second virtual address and the access permission of the third process for the second virtual address are separately stored in different page tables. In this way, the maliciously attacked second process can obtain only a page table storing the access permission of the second process. Therefore, only the access permission of the second process for the second virtual address can be read, and the access permission of the third process for the second virtual address cannot be read. This further ensures isolation between the second process and the third process, and improves security of the operating system.

Similarly, the access permission of the second process for the second virtual address and the access permission of the kernel for the second virtual address may alternatively be separately stored in different page tables. In this way, the maliciously attacked second process can obtain only a page table storing the access permission of the second process. Therefore, only the access permission of the second process for the second virtual address can be read, and the access permission of the kernel for the second virtual address cannot be read. This further ensures isolation between the second process and the kernel, and improves security of the operating system. It should be noted that for the second virtual address, there are a plurality of methods for separately configuring different access permission for the second process and the kernel. This is not specifically limited in this embodiment of this application. The following describes a method for configuring access permission. In this method, for the second virtual address, different domains are separately configured for the second process and the third process. Similarly, for the second virtual address, different domains may alternatively be separately configured for the second process and the kernel. Then, the access permission is configured for the second virtual address by setting a relationship between the domain and the access permission.

Based on the foregoing embodiment, in another embodiment of the method for inter-process communication provided in embodiments of this application, for the second process, the second virtual address corresponds to a first domain (domain); and for the kernel or the third process, the second virtual address corresponds to a second domain. The following uses the kernel as an example for description.

It may be understood that, for the second virtual address, the second process and the kernel separately correspond to different domains. Therefore, a correspondence between a domain and access permission may be preconfigured, and the access permission of the second process for the second virtual address and the access permission of the kernel for the second virtual address may be determined based on the correspondence between the domain and the access permission.

Specifically, the kernel determining the access permission of the second process for the second virtual address based on an identifier of a process in the first instruction includes: The kernel determines a correspondence between the first domain and access permission based on the identifier of the second process in the first instruction.

The kernel writing the access permission of the second process for the second virtual address into a first register includes: The kernel writes the correspondence between the first domain and the access permission into the first register.

Similarly, based on the foregoing embodiment, in another embodiment of the method for inter-process communication provided in embodiments of this application, the kernel determining the access permission of the kernel for the second virtual address based on an identifier of the kernel in the first instruction includes: The kernel determines a correspondence between the second domain and access permission based on the identifier of the kernel in the first instruction.

The kernel updating the access permission that is of the second process for the second virtual address and that is in the first register to the access permission of the kernel for the second virtual address includes: The kernel updates the correspondence that is between the first domain and the access permission and that is in the first register to the correspondence between the second domain and the access permission.

Based on the foregoing embodiments, in another embodiment of the method for inter-process communication provided in embodiments of this application, a correspondence between the second virtual address and the first domain and a correspondence between the kernel and the second domain are separately stored in different page tables.

Figure 8:
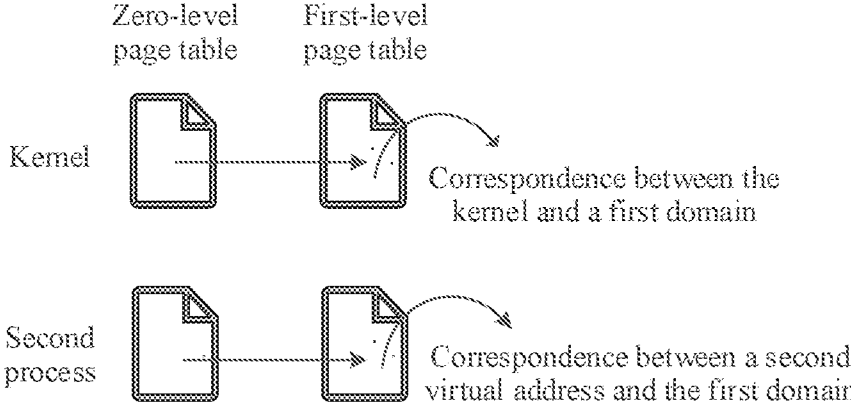
FIG. 8 is a schematic diagram of a third embodiment of context switching according to an embodiment of this application.
Figure 9:
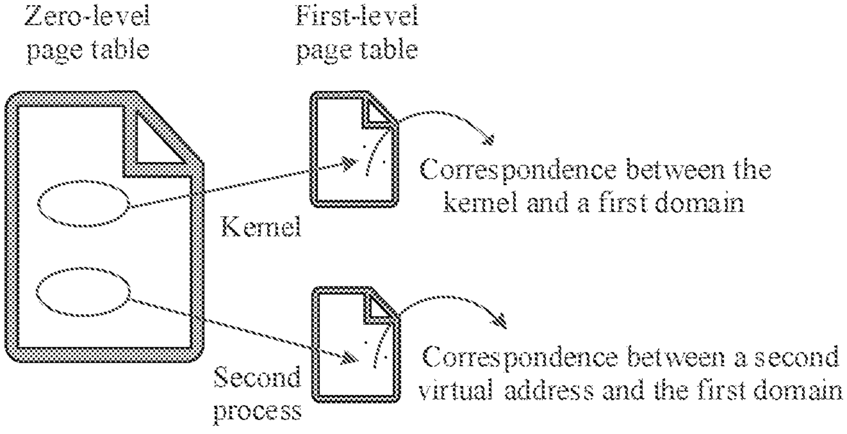
FIG. 9 is a schematic diagram of an embodiment of a storage location of a correspondence between a virtual address and a domain.

For example, in an ARM architecture, the correspondence between the second virtual address and the first domain and the correspondence between the kernel and the first domain may be separately stored in different first-level page tables. Because an address of the first-level page table is stored in a zero-level page table, as shown in FIG. 8, the second process and the kernel may separately correspond to different zero-level page tables. In addition, as shown in FIG. 9, the second process and the kernel may correspond to a same zero-level page table, and then different addresses are divided in the zero-level page table, so that one address points to one first-level page table, and the other address points to another first-level page table. In this way, the second process and the kernel correspond to different first-level page tables, and the correspondence between the second virtual address and the first domain and the correspondence between the kernel and the first domain may be separately stored in different first-level page tables.

In the foregoing embodiments, for the second virtual address, a domain corresponding to the kernel is different from a domain corresponding to the first process, and different domains correspond to different access permission. It should be noted that, in another possible implementation, for the second virtual address, the domain corresponding to the kernel may be the same as the domain corresponding to the first process, but for a same domain, the kernel and the first process separately have different access permission. For example, for the second virtual address, both the kernel and the first process correspond to a third domain, and access permission of the kernel for the third domain is different from access permission of the first process for the third domain.

In the foregoing embodiments, the second process and the kernel have different access permission for the second virtual address. In this way, the second process can be isolated from the kernel, to ensure security of the second process and the kernel. It should be noted that, in some scenarios, security may be sacrificed to improve performance of the operating system.

Specifically, based on the foregoing embodiments, in another embodiment of the method for inter-process communication provided in embodiments of this application, the operating system further includes a third system program that runs in a kernel mode as an independent fourth process. The second process and the fourth process have same access permission for the address in the kernel space.

In this embodiment of this application, because the second process and the fourth process have the same access permission for the address in the kernel space, in the context switching process, the access permission of the second process for the address in the kernel space and the access permission of the fourth process for the address in the kernel space do not need to be switched. This reduces overheads of context switching and improves performance of the operating system.

The third system program is different from the first system program, and may alternatively be any one of the following system programs: a file system program, a memory management program, a network program, and a driver.

Figure 11:
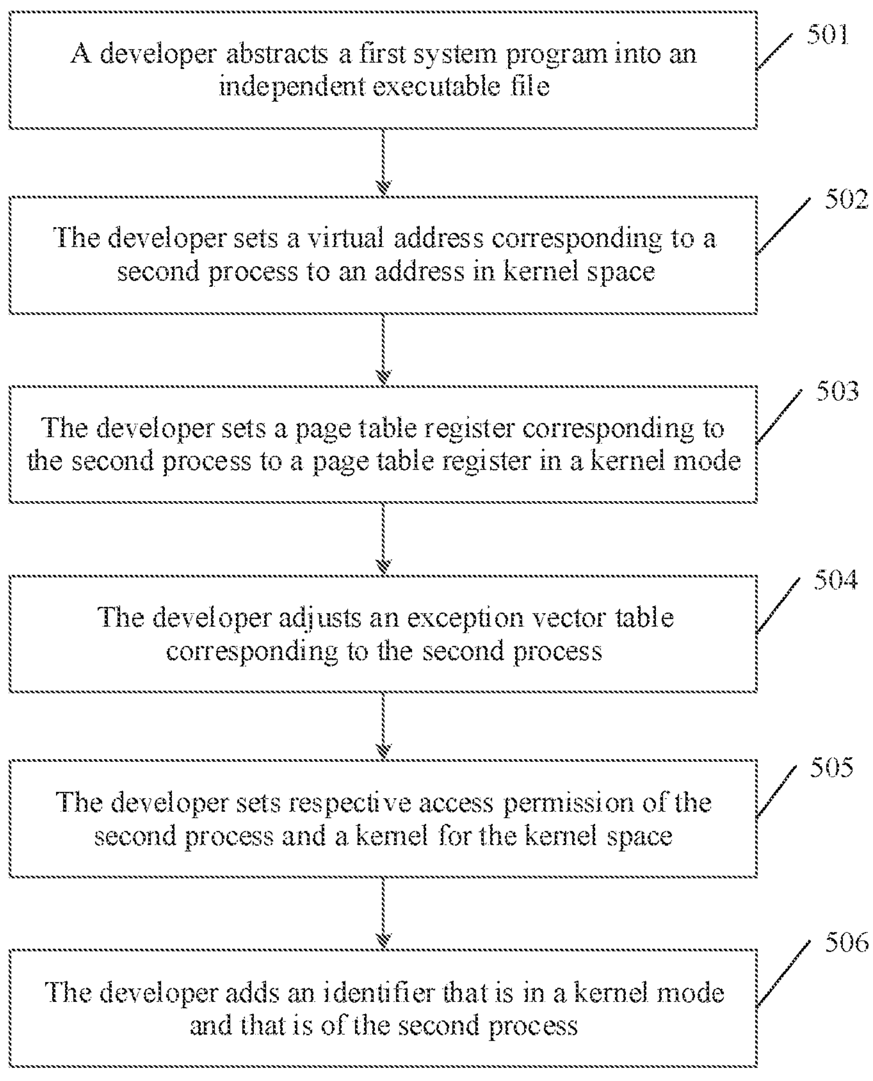
FIG. 11 is a schematic diagram of an embodiment of designing an operating system according to an embodiment of this application.

In conclusion, it can be learned that the solution provided in this embodiment of this application may be considered as transferring a system program that runs in a user mode and that is in an existing microkernel architecture to a kernel mode, or may be considered as separating a system program that is in an existing monolithic kernel architecture and that is in a same process as a kernel, that is, the system program that is in a same process as the kernel runs as an independent process. Specifically, as shown in FIG. 11, in a design phase of the operating system, the system program may be enabled to run in a kernel mode as the second process by using the following steps.

Step 501: A developer abstracts a first system program into an independent executable file.

Step 502: The developer sets a virtual address corresponding to the second process to an address in kernel space.

Step 503: The developer sets a page table register corresponding to the second process to a page table register in a kernel mode.

Step 504: The developer adjusts an exception vector table corresponding to the second process.

It should be noted that step 502, step 503, and step 505 may be specifically understood with reference to the foregoing related description.

Step 505: The developer sets respective access permission of the second process and the kernel for the kernel space.

Specifically, step 505 may be understood with reference to related descriptions of access permission of the second process and the kernel for the second virtual address in the foregoing embodiment.

Step 506: The developer adds an identifier that is in a kernel mode and that is of the second process.

It may be understood that, by performing step 501 to step 506 and another operation that may exist, the system program may be enabled to run in a kernel mode as the independent second process. An execution sequence of step 501 to step 506 may be adjusted based on an actual requirement. This is not specifically limited in this embodiment of this application.

Figure 12:
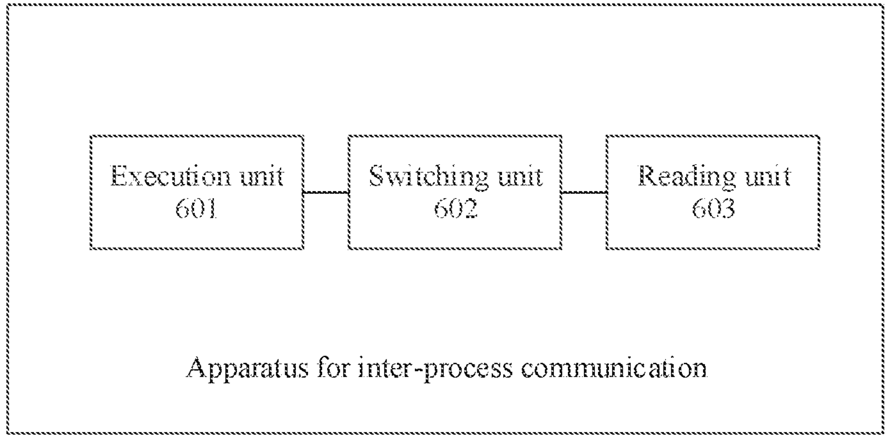
FIG. 12 is a schematic diagram of an embodiment of an apparatus for inter-process communication according to an embodiment of this application.

Refer to FIG. 12, an embodiment of this application further provides an apparatus for inter-process communication. The apparatus includes:

an execution unit 601, configured to execute a first instruction, where the first instruction instructs a first process to invoke a second process, the first process is an application program or a system program in a user mode, and the second process is a first system program in a kernel mode; a switching unit 602, configured to switch a context of the first process to a context of the second process based on the first instruction; and the execution unit 601, further configured to execute the second process.

In a possible implementation, the switching unit 602 is for a kernel to determine a page table base address that is of the second process and that corresponds to an identifier of the second process in the first instruction; store a page table base address that is of the first process and that is in a page table register in a user mode into a memory; and write the page table base address of the second process into a page table register in a kernel mode.

In a possible implementation, the first instruction carries a virtual address of the first process. The apparatus further includes a reading unit 603, configured to read, based on a page table of the first process, data in a physical address corresponding to the virtual address of the first process. The page table includes an association relationship between the virtual address and the physical address of the first process.

In a possible implementation, the execution unit 601 is further configured to execute a second instruction, where the second instruction instructs the second process to invoke the kernel or a third process; and the switching unit 602 is further configured to switch the context of the second process to a context of the kernel or the third process, where the third process is a second system program running in a kernel mode.

In a possible implementation, for a second virtual address, the kernel or the third process has different access permission from the second process, and the second virtual address is an address in kernel space. The switching unit 602 is for the kernel to determine access permission that corresponds to the identifier of the second process in the first instruction and that is of the second process for the second virtual address; and write the access permission of the second process for the second virtual address into a first register. The first register is configured to store access permission for the address in the kernel space.

In a possible implementation, the switching unit 602 is configured to determine access permission of the kernel for the second virtual address based on an identifier of the kernel in the second instruction; and update the access permission that is of the second process for the second virtual address and that is in the first register to the access permission of the kernel for the second virtual address.

In a possible implementation, the switching unit 602 is configured to determine access permission of the third process for the second virtual address based on an identifier of the third process in the second instruction; and update the access permission that is of the second process for the second virtual address and that is in the first register to the access permission of the third process for the second virtual address.

In a possible implementation, the access permission of the second process for the second virtual address and the access permission of the third process for the second virtual address are separately stored in different page tables; or the access permission of the second process for the second virtual address and the access permission of the kernel for the second virtual address are separately stored in different page tables.

In a possible implementation, the operating system further includes a third system program that runs in a kernel mode as an independent fourth process. The second process and the fourth process have same access permission for the address in the kernel space.

For specific implementations, related descriptions, and technical effects of the foregoing units, refer to the descriptions of the method for inter-process communication in embodiments of this application.

Figure 13:
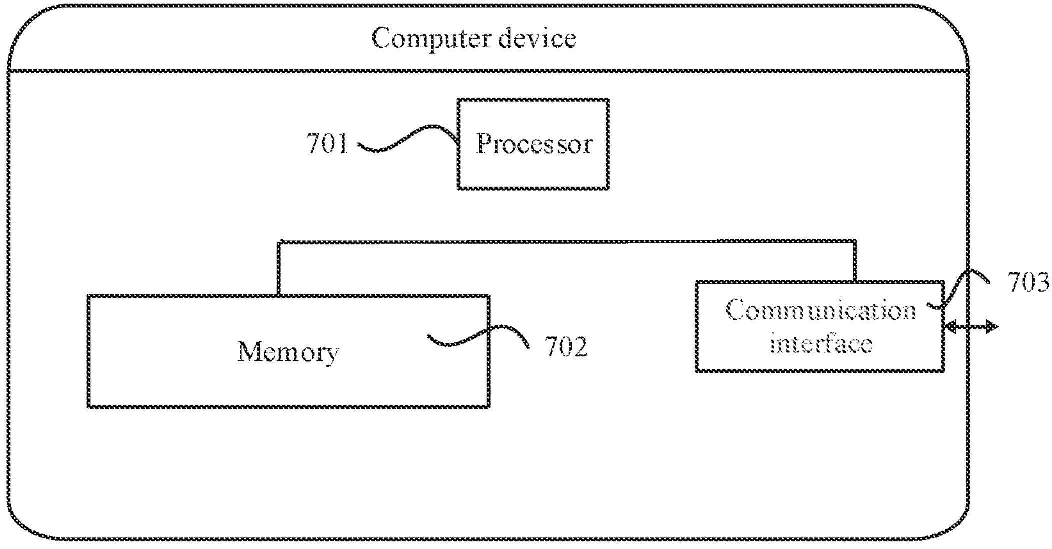
FIG. 13 is a schematic diagram of an embodiment of a computer device according to an embodiment of this application.

FIG. 13 is a schematic diagram of a structure of a computer device according to an embodiment of this application.

An embodiment of the computer device in this embodiment of this application may include one or more processors 701, a memory 702, and a communication interface 703.

The memory 702 may perform ephemeral storage or durable storage. Further, the processor 701 may be configured to communicate with the memory 702, and perform, on a control device, operations of a series of instructions in the memory 702.

In this embodiment, the processor 701 may perform the steps of the methods in the foregoing embodiments. Details are not described herein again.

For example, the processor 701 may perform the following steps:

executing a first instruction, where the first instruction instructs a first process to invoke a second process, the first process is an application program or a system program in a user mode, and the second process is a first system program in a kernel mode;

in response to the first instruction, a kernel switches a context of the first process to a context of the second process based on the first instruction; and executing the second process.

In this embodiment of this application, specific functional module division of the processor 701 may be similar to the functional module division described in FIG. 12. Details are not described herein again.

An embodiment of this application further provides a chip or a chip system. The chip or the chip system includes at least one processor and a communication interface. The communication interface and the at least one processor are interconnected through a line. The at least one processor is configured to run a computer program or instructions, to perform the steps of the methods in the foregoing embodiments. Details are not described herein again.

The communication interface in the chip may be an input/output interface, a pin, a circuit, or the like.

An embodiment of this application further provides a first implementation of a chip or a chip system. The chip or the chip system described above in this application further includes at least one memory. The at least one memory stores instructions. The memory may be a storage unit inside the chip, for example, a register or a cache, or may be a storage unit (for example, a read-only memory or a random access memory) of the chip.

An embodiment of this application further provides a computer storage medium. The computer storage medium is configured to store computer software instructions used by the foregoing computer device, and the computer software instructions include a program designed for execution by the computer device.

The computer device may be the apparatus for inter-process communication described in FIG. 12.

An embodiment of this application further provides a computer program product. The computer program product includes computer software instructions, and the computer software instructions may be loaded by a processor to implement the procedures in the methods shown in the foregoing embodiments.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in embodiments of this application. The storage medium includes any medium that can store program code, such as a USB flash drive, a removable hard disk, a read-only memory (ROM, Read-Only Memory), a random access memory (RAM, Random Access Memory), a magnetic disk, or an optical disc.

What is claimed is:

1. A method for inter-process communication, wherein the method is applied to a computer device, and the method comprises:

executing a first instruction, wherein the first instruction instructs a first process to invoke a second process, the first process is an application program or a system program in a user mode, and the second process is a first system program in a kernel mode, wherein the second process is an independent process separate from a process of a kernel, wherein the computer device further comprises a third system program that runs in a kernel mode as an independent fourth process, and wherein the second process and the fourth process have same access permission for an address in kernel space;

in response to executing the first instruction, switching, by the kernel, a context of the first process to a context of the second process based on the first instruction; and executing the second process.

2. The method according to claim 1, wherein the switching, by a kernel, a context of the first process to a context of the second process comprises:

determining, by the kernel, a page table base address that is of the second process and that corresponds to an identifier of the second process in the first instruction;

storing, by the kernel, a page table base address that is of the first process and that is in a first page table register in a user mode into a memory; and writing, by the kernel, the page table base address of the second process into a second page table register in a kernel mode.

3. The method according to claim 1, wherein the first instruction carries a virtual address of the first process, and wherein after the executing the second process, the method further comprises:

reading, by the second process based on a page table of the first process, data in a physical address corresponding to the virtual address of the first process, wherein the page table comprises an association relationship between the virtual address and the physical address of the first process.

4. The method according to claim 1, wherein the method further comprises:

executing a second instruction, wherein the second instruction instructs the second process to invoke the kernel or a third process; and in response to executing the second instruction, switching, by the kernel, the context of the second process to a context of the kernel or the third process, wherein the third process is a second system program running in a kernel mode.

5. The method according to claim 4, wherein for a second virtual address, the kernel or the third process has different access permission from the second process, and the second virtual address is an address in kernel space, and wherein the switching, by a kernel, a context of the first process to a context of the second process based on the first instruction comprises:

determining, by the kernel, access permission that corresponds to an identifier of the second process in the first instruction and that is of the second process for the second virtual address; and writing, by the kernel, the access permission of the second process for the second virtual address into a first register, wherein the first register is configured to store access permission for the address in the kernel space.

6. The method according to claim 5, wherein the switching, by the kernel, the context of the second process to a context of the kernel or the third process comprises:

determining, by the kernel, access permission of the kernel for the second virtual address based on an identifier of the kernel in the second instruction; and updating, by the kernel, the access permission that is of the second process for the second virtual address and that is in the first register to the access permission of the kernel for the second virtual address.

7. The method according to claim 5, wherein the switching, by the kernel, the context of the second process to a context of the kernel or the third process comprises:

determining, by the kernel, access permission of the third process for the second virtual address based on an identifier of the third process in the second instruction; and updating, by the kernel, the access permission that is of the second process for the second virtual address and that is in the first register to the access permission of the third process for the second virtual address.

8. The method according to claim 5, wherein:

the access permission of the second process for the second virtual address and the access permission of the third process for the second virtual address are separately stored in different page tables; or the access permission of the second process for the second virtual address and the access permission of the kernel for the second virtual address are separately stored in different page tables.

9. An apparatus for inter-process communication, wherein the apparatus comprises:

at least one processor; and one or more memories coupled to the at least one processor and storing programming instructions for execution by the at least one processor to cause the apparatus to:

execute a first instruction, wherein the first instruction instructs a first process to invoke a second process, the first process is an application program or a system program in a user mode, and the second process is a first system program in a kernel mode, wherein the second process is an independent process separate from a process of a kernel, wherein the apparatus further comprises a third system program that runs in a kernel mode as an independent fourth process, and wherein the second process and the fourth process have same access permission for an address in kernel space;

switch a context of the first process to a context of the second process based on the first instruction; and execute the second process.

10. The apparatus according to claim 9, wherein the programming instructions, when executed by the at least one processor, cause the apparatus to:

determine a page table base address that is of the second process and that corresponds to an identifier of the second process in the first instruction;

store a page table base address that is of the first process and that is in a first page table register in a user mode into a memory; and write the page table base address of the second process into a second page table register in a kernel mode.

11. The apparatus according to claim 9, wherein the first instruction carries a virtual address of the first process, and wherein the programming instructions, when executed by the at least one processor, cause the apparatus to:

read, based on a page table of the first process, data in a physical address corresponding to the virtual address of the first process, wherein the page table comprises an association relationship between the virtual address and the physical address of the first process.

12. The apparatus according to claim 9, wherein the programming instructions, when executed by the at least one processor, cause the apparatus to:

execute a second instruction, wherein the second instruction instructs the second process to invoke a kernel or a third process; and in response to the second instruction, switch the context of the second process to a context of the kernel or the third process, wherein the third process is a second system program running in a kernel mode.

13. The apparatus according to claim 12, wherein for a second virtual address, the kernel or the third process has different access permission from the second process, and the second virtual address is an address in kernel space, and wherein the programming instructions, when executed by the at least one processor, cause the apparatus to:

determine access permission that corresponds to an identifier of the second process in the first instruction and that is of the second process for the second virtual address; and write the access permission of the second process for the second virtual address into a first register, wherein the first register is configured to store access permission for the address in the kernel space.

14. The apparatus according to claim 13, wherein the programming instructions, when executed by the at least one processor, cause the apparatus to:

determine access permission of the kernel for the second virtual address based on an identifier of the kernel in the second instruction; and update the access permission that is of the second process for the second virtual address and that is in the first register to the access permission of the kernel for the second virtual address.

15. The apparatus according to claim 13, wherein the programming instructions, when executed by the at least one processor, cause the apparatus to:

determine access permission of the third process for the second virtual address based on an identifier of the third process in the second instruction; and update the access permission that is of the second process for the second virtual address and that is in the first register to the access permission of the third process for the second virtual address.

16. The apparatus according to claim 13, wherein:

the access permission of the second process for the second virtual address and the access permission of the third process for the second virtual address are separately stored in different page tables; or the access permission of the second process for the second virtual address and the access permission of the kernel for the second virtual address are separately stored in different page tables.

17. A non-transitory computer-readable storage medium storing programming instructions for execution by at least one processor, that when executed by the at least one processor, cause a computer to perform operations comprising:

executing a first instruction, wherein the first instruction instructs a first process to invoke a second process, the first process is an application program or a system program in a user mode, and the second process is a first system program in a kernel mode, wherein the second process is an independent process separate from a process of a kernel, wherein the computer device further comprises a third system program that runs in a kernel mode as an independent fourth process, and wherein the second process and the fourth process have same access permission for an address in kernel space;

in response to executing the first instruction, switching, by the kernel, a context of the first process to a context of the second process based on the first instruction; and executing the second process.

18. The non-transitory computer-readable storage medium according to claim 17, wherein the switching, by a kernel, a context of the first process to a context of the second process comprises:

determining, by the kernel, a page table base address that is of the second process and that corresponds to an identifier of the second process in the first instruction;

storing, by the kernel, a page table base address that is of the first process and that is in a first page table register in a user mode into a memory; and writing, by the kernel, the page table base address of the second process into a second page table register in a kernel mode.

* * * * *